(12) United States Patent

Suga et al.

(10) Patent No.: US 9,502,181 B2
(45) Date of Patent: Nov. 22, 2016

(54) LOW-HEIGHT MULTILAYER CERAMIC CAPACITOR

(71) Applicant: TAIYO YUDEN CO., LTD., Taito-ku, Tokyo (JP)

(72) Inventors: Yasutomo Suga, Takasaki (JP); Masataka Watabe, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 205 days.

(21) Appl. No.: 14/206,237

(22) Filed: Mar. 12, 2014

(65) Prior Publication Data

US 2014/0285947 A1 Sep. 25, 2014

(30) Foreign Application Priority Data

Mar. 19, 2013 (JP) ................................. 2013-056599

(51) Int. Cl.
 *H01G 4/30* (2006.01)
 *H01G 4/228* (2006.01)
 *H01G 4/232* (2006.01)

(52) U.S. Cl.
 CPC ............. *H01G 4/30* (2013.01); *H01G 4/232* (2013.01)

(58) Field of Classification Search
 USPC .................................. 361/303, 306.3, 301.4
 See application file for complete search history.

(56) References Cited

U.S. PATENT DOCUMENTS

| 2012/0019099 | A1 | 1/2012 | Sato et al. | |
|---|---|---|---|---|
| 2013/0050894 | A1 | 2/2013 | Ahn et al. | |
| 2013/0200749 | A1* | 8/2013 | Nishisaka | H01G 4/30 310/311 |
| 2014/0002949 | A1 | 1/2014 | Gu et al. | |

FOREIGN PATENT DOCUMENTS

| JP | 2012-028458 A | 2/2012 |
|---|---|---|
| JP | 2013-046069 A | 3/2013 |
| JP | 2014-011449 A | 1/2014 |

OTHER PUBLICATIONS

A Notice of Reasons for Refusal issued by Japanese Patent Office, mailed Sep. 8, 2014, for Japanese counterpart application No. 2013-056599.
A Notification of Examination Opinions with Search Report issued by Taiwan Intellectual Property Office on Dec. 19, 2014, for Taiwan counterpart application No. 103105703.

* cited by examiner

*Primary Examiner* — Eric Thomas
(74) *Attorney, Agent, or Firm* — Law Office of Katsuhiro Arai

(57) ABSTRACT

A low-height multilayer ceramic capacitor offering excellent flexure strength meets the condition "t11c<t12b," where t11c represents the thickness of each protective dielectric layer provided on respective top and bottom sides of a dielectric chip, and t12b represents the thickness of a wraparound part of each external electrode provided at least part of both top and bottom faces of the dielectric chip.

4 Claims, 2 Drawing Sheets

Fig. 3
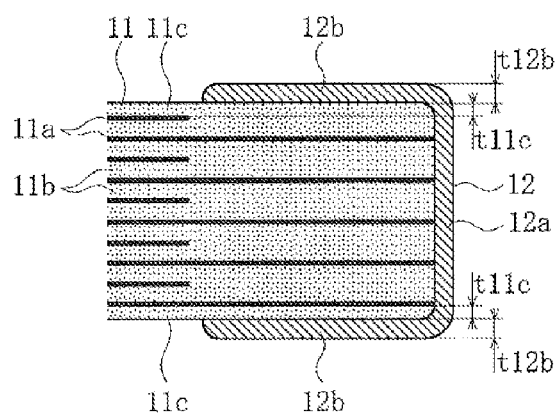
Fig. 4
|  | Sample 1A | Sample 1B | Sample 1C | Sample 1D |
|---|---|---|---|---|
| t11c ($\mu$m) | 16 | 16 | 16 | 16 |
| t12b ($\mu$m) | 12 | 14 | 18 | 20 |
| L12b ($\mu$m) | 160 | 160 | 160 | 160 |
| L10 ($\mu$m) | 1000 | 1000 | 1000 | 1000 |
| Flexure strength (mm) | 2.17 | 2.40 | 2.88 | 3.20 |
Fig. 5
|  | Sample 2A | Sample 2B | Sample 2C | Sample 2D |
|---|---|---|---|---|
| t11c ($\mu$m) | 16 | 16 | 16 | 16 |
| t12b ($\mu$m) | 18 | 18 | 18 | 18 |
| L12b ($\mu$m) | 160 | 240 | 250 | 320 |
| L10 ($\mu$m) | 1000 | 1000 | 1000 | 1000 |
| L12b/L10 | 0.16 | 0.24 | 0.25 | 0.32 |
| Flexure strength (mm) | 2.88 | 2.79 | 1.82 | 1.80 |
Fig. 6
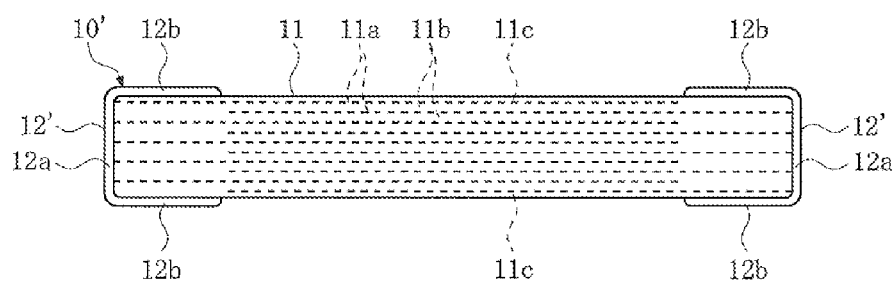

the present invention relates to a low-height multilayer ceramic capacitor whose height is smaller than its width.

LOW-HEIGHT MULTILAYER CERAMIC CAPACITOR

FIELD OF THE INVENTION

The present invention relates to a low-height multilayer ceramic capacitor whose height is smaller than its width.

DESCRIPTION OF THE RELATED ART

Low-height multilayer ceramic capacitors (refer to Patent Literature 1 below) are wider than they are high, so they generally have lower flexure strength compared to laminated ceramic capacitors whose height is equal to or greater than their width.

The aforementioned flexure strength is generally measured by soldering the low-height multilayer ceramic capacitor on one side of a substrate and then, with this side of the board resting on support pieces, pressing downward with a jig at a constant speed and thereby deforming the area on the other side corresponding to the soldered location of the capacitor, in order to measure the amount (in mm) by which the jig is pushed in when the low-height multilayer ceramic capacitor has undergone a capacity reduction of a specified ratio (%) or more during the deformation process.

These low-height multilayer ceramic capacitors are useful for reducing the thicknesses of circuit boards on which such low-height multilayer ceramic capacitors are mounted, and for reducing the thicknesses of mobile phones, smartphones and other mobile devices in which such circuit boards are incorporated. However, since low-height multilayer ceramic capacitors have low flexure strength as mentioned above, they may exhibit functional problems such as capacity reduction when the circuit board deflects due to thermal shock, etc.

Any discussion of problems and solutions involved in the related art has been included in this disclosure solely for the purposes of providing a context for the present invention, and should not be taken as an admission that any or all of the discussion were known at the time the invention was made.

BACKGROUND ART LITERATURES

[Patent Literature 1] Japanese Patent Laid-open No. 2012-028458

SUMMARY

An object of the present invention is to provide a low-height multilayer ceramic capacitor offering excellent flexure strength.

To achieve the aforementioned object, the present invention provides a low-height multilayer ceramic capacitor whose height is smaller than its width and comprising a dielectric chip of roughly rectangular solid shape having an external electrode at each end of the chip in its length direction; wherein the dielectric chip has multiple internal electrode layers laminated in the height direction alternately with capacity-forming dielectric layers, as well as protective dielectric layers provided in a manner covering the internal electrode layers on both sides in the height direction; the external electrodes each have an end face covering an end face of the dielectric chip in the length direction, as well as a wraparound part continuing to the end face and covering both sides of the dielectric chip in the height direction at least partially; the ends of some of the multiple internal electrode layers are connected to the end face of one of the external electrodes, while the other ends are connected to the end face of the other external electrode; and when the thickness of each of the protective dielectric layers of the dielectric chip is given by t11$c$ and the thickness of the wraparound part of each of the external electrodes is given by t12$b$, then t11$c$ and t12$b$ meet the condition "t11$c$<t12$b$."

According to the present invention, a low-height multilayer ceramic capacitor offering excellent flexure strength can be provided.

The aforementioned and other objects of the present invention and the characteristics and effects according to each object are made clear by the explanations below and drawings attached hereto.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 3 is an enlarged view of area B in FIG. 2.

FIG. 4 is a table showing the specifications and flexure strengths of Samples 1A to 1D, respectively.

FIG. 5 is a table showing the specifications and flexure strengths of Samples 2A to 2D, respectively.

FIG. 6 is a side view of a low-height multilayer ceramic capacitor in the width direction, representing an example of variation of the low-height multilayer ceramic capacitor shown in FIGS. 1 to 3.

DESCRIPTION OF THE SYMBOLS 10, 10' - - - Low-height multilayer ceramic capacitor, L10 - - - Length of low-height multilayer ceramic capacitor, 11 - - - Dielectric chip, 11$a$ - - - Internal electrode layer, 12$b$ - - - Capacity-forming dielectric layer, 11$c$ - - - Protective dielectric layer, t11$c$ - - - Thickness of protective dielectric layer, 12, 12' - - - External electrode, 12$a$ - - - End face, 12$b$ - - - Wraparound part, t12$b$ - - - Thickness of wraparound part, L12$b$ - - - Length of wraparound part.

DETAILED DESCRIPTION OF EMBODIMENTS

First, the structure of a low-height multilayer ceramic capacitor 10 to which the present invention is applied (hereinafter simply referred to as "low-height capacitor 10") is explained by referring to FIGS. 1 to 3.

Figure 1:
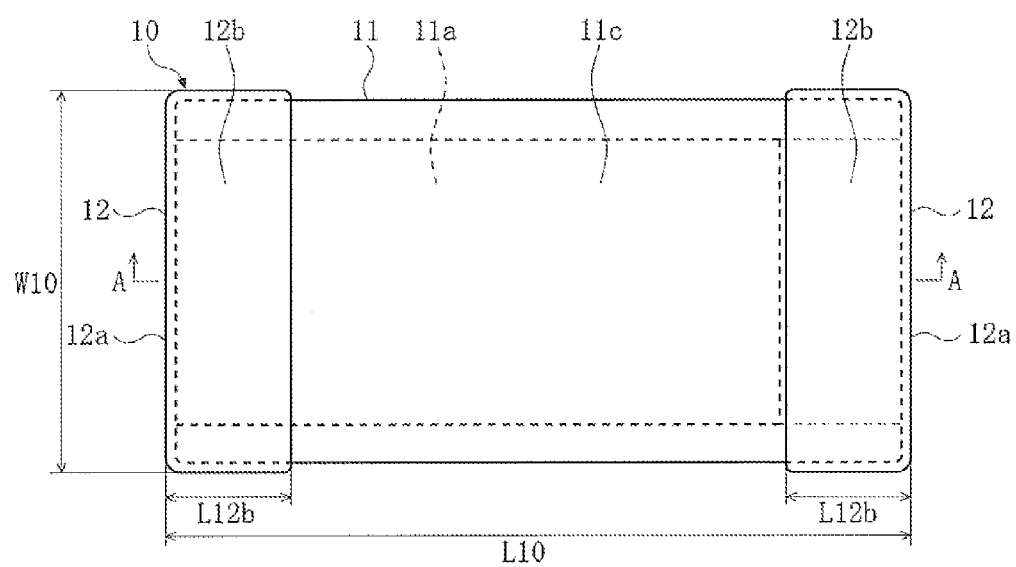
FIG. 1 is a top view of a low-height multilayer ceramic capacitor to which the present invention is applied.
Figure 2:
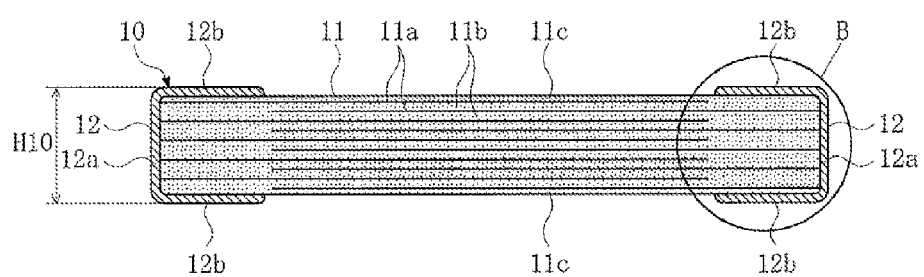
FIG. 2 is a section view of FIG. 1, cut along line A-A.

The low-height capacitor 10 shown in FIGS. 1 to 3 comprises a dielectric chip 11 of roughly rectangular solid shape having an external electrode 12 at each end of the dielectric chip 11 in the length direction, where its height H10 is smaller than its width W10, while its length L10 is greater than its width W10.

The dielectric chip 11 has multiple (10 in FIG. 2) internal electrode layers 11a laminated in the height direction alternately with capacity-forming dielectric layers 11b, as well as protective dielectric layers 11c provided in a manner covering the internal electrode layers 11a on both sides in the height direction. Although the total number of internal electrode layers 11a is 10 in FIG. 2 for the purpose of illustration, the total number of internal electrode layers 11a in a low-height capacitor 10 whose height H10 is 150 μm or less is actually 15 or more, for example.

The material for the remainder of the dielectric chip 11 other than the internal electrode layers 11a, or specifically the capacity-forming dielectric layers 11b and protective dielectric layers 11c, is dielectric ceramics, or preferably dielectric ceramics of ϵ>1000 or Class 2 (of high dielectric constant), where the thickness of each capacity-forming dielectric layer 11b is roughly the same and the thickness t11c of each protective dielectric layer 11c (refer to FIG. 3) is also roughly the same. Specific examples of dielectric ceramics used for the capacity-forming dielectric layers 11b and protective dielectric layers 11c include barium titanate, strontium titanate, calcium titanate, magnesium titanate, calcium zirconate, calcium zirconate-titanate, barium zirconate, and titanium oxide. Additionally, the internal electrode layers 11a of the dielectric chip 11 use a metal material, and the thickness and top-view shape (roughly rectangular) of each internal electrode layer 11a are roughly the same. Specific examples of metals used for the internal electrode layers 11a include nickel, copper, palladium, platinum, silver, gold, and any alloy thereof.

On the other hand, each external electrode 12 has an end face 12a covering an end face of the dielectric chip 11 in the length direction, as well as a wraparound part 12b continuing to the end face 12a and partially covering both sides in the height direction and both sides in the width direction of the dielectric chip 11. As shown in FIG. 2, the ends of some of the multiple internal electrode layers 11a of the dielectric chip 11 (odd-numbered layers from the top in FIG. 2) are connected to the end face 12a of one of the external electrodes 12 (left side in FIG. 2), while the other ends (even-numbered layers from the top in FIG. 2) are connected to the end face 12a of the other external electrode 12 (right side in FIG. 2).

The external electrodes 12 use a metal material, and the thicknesses of their end faces 12a and thicknesses t12b of their wraparound parts 12b (refer to FIG. 3) are roughly the same. Although not illustrated, actually each external electrode 12 has a two-layer structure comprising a base layer contacting the dielectric chip 11 and a surface layer contacting the base layer, or a multi-layer structure having at least one intermediate layer between the base layer and surface layer. Specific examples of metals used for the base layer include nickel, copper, palladium, platinum, silver, gold, and any alloy thereof, specific examples of metals used for the surface layer include tin, palladium, gold, and zinc, and specific examples of metals used for the intermediate layer include platinum, palladium, gold, copper, and nickel.

As shown in FIG. 3, the thickness t11c of each protective dielectric layer 11c of the dielectric chip 11 on one hand, and the thickness t12b of the wraparound part 12b of each external electrode 12 on the other, meet the condition "[Thickness t11c of each protective dielectric layer 11c of the dielectric chip 11] <[Thickness t12b of the wraparound part 12b of each external electrode 12]." This condition will be described later in detail.

Also, as shown in FIG. 1, the length L12b of the wraparound part 12b of each external electrode 12 (length along the low-height capacitor 10 in the length direction) on one hand, and the length L10 of the low-height capacitor 10 on the other, meet the condition "{[Length L12b of the wraparound part 12b of each external electrode 12]/[Length L10 of the low-height capacitor 10]}<0.24." This condition will be described later in detail.

Next, the specifications and flexure strengths of Samples 1A to 1D and Samples 2A to 2D are explained by referring to FIGS. 4 and 5.

Samples 1A to 1D shown in FIG. 4 and Samples 2A to 2D shown in FIG. 5 are low-height capacitors having a structure equivalent to that of the low-height capacitor 10 shown in FIGS. 1 to 3. Using the symbols shown in FIGS. 1 to 3, the length L10, width W10 and height H10 of each of Samples 1A to 1D and 2A to 2D are 1000 μm, 500 μm, and 150 μm, respectively. Also, the material for the remainder of the dielectric chip 11 other than the internal electrode layers 11a, or specifically the capacity-forming dielectric layers 11b and protective dielectric layers 11c, of each of Samples 1A to 1D and 2A to 2D is barium titanate, while the material for the internal electrode layers 11a is nickel, where the thickness of each capacity-forming dielectric layer 11b is roughly 5 μm, the thickness of each internal electrode layer 11a is roughly 1 μm, and the total number of internal electrode layers 11a is 15. Furthermore, the external electrodes 12 of Samples 1A to 1D and 2A to 2D have a three-layer structure comprising a nickel base layer, copper intermediate layer, and tin surface layer.

Samples 1A to 1D and 2A to 2D are each produced by: stacking multiple first green sheets obtained by applying and drying a slurry containing barium titanate powder; stacking multiple second green sheets obtained by printing a paste containing nickel powder on the first green sheets and then drying the paste; stacking multiple first green sheets on top of the second green sheets and compressing the sheets together, followed by cutting the compressed sheets to a specified size to obtain an unsintered chip corresponding to a dielectric chip 11; applying a paste containing nickel powder on both ends of the unsintered chip in the length direction and then sintering the paste simultaneously with the unsintered chip to obtain a sintered chip with base layer; and forming a copper film and tin film (intermediate layer and surface layer) in this order, by means of electroplating, on the base layer of the sintered chip with base layer.

As shown in FIG. 4, the thickness t11c of each protective dielectric layer 11c of the dielectric chip 11 is 16 μm with all of Samples 1A to 1D, while the thickness t12b of the wraparound part 12b of each external electrode 12 varies four ways, namely, 12 μm, 14 μm, 18 μm, and 20 μm, and the length L12b of the wraparound part 12b of each external electrode 12 is 160 μm with all samples. In other words, Samples 1A to 1D differ only in the thickness t12b of the wraparound part 12b of each external electrode 12.

Also, as shown in FIG. 5, the thickness t11c of each protective dielectric layer 11c of the dielectric chip 11 is 16 μm with all of Samples 2A to 2D, while the thickness t12b of the wraparound part 12b of each external electrode 12 is 18 μm with all samples, and the length L12b of the wraparound part 12b of each external electrode 12 varies four ways, namely, 160 μm, 240 μm, 250 μm, and 320 μm. In other words, Samples 2A to 2D meet the condition "[Thickness t11c of each protective dielectric layer 11c of the dielectric chip 11]<[Thickness t12b of the wraparound part 12b of each external electrode 12]" and differ only in the thickness t12b of the wraparound part 12b of each external electrode 12.

The "flexure strength (mm)" shown in FIGS. 4 and 5 is measured by soldering the sample (each of Samples 1A to 1D and 2A to 2D) on one side of a glass epoxy board conforming to JIS-C-6484 and then, with this side of the glass epoxy board resting on support pieces at 45 mm from both sides of the soldered location of the sample, pressing downward with a jig (whose pressurization part consists of a curved surface of 230 mm in curvature radius) at a constant speed of 0.5 mm/sec and thereby deforming the area on the other side corresponding to the soldered location of the sample, in order to measure the amount (in mm) by which the jig is pushed in when the sample has undergone a capacity reduction of 12.5% or more during the deformation process.

Low-height capacitors having the dimensions of Samples 1A to 1D and 2A to 2D, or specifically length L10 of 1000 μm, width W10 of 500 μm and height H10 of 150 μm, are generally considered fit for practical use so long as their flexure strength is 2.5 mm or more.

Among Samples 1A to 1D, Samples 1C and 1D have a flexure strength of 2.5 mm or more and both meet the condition "[Thickness t11c of each protective dielectric layer 11c of the dielectric chip 11]<[Thickness t12b of the wraparound part 12b of each external electrode 12]." In essence, the low-height capacitor 10 shown in FIGS. 1 to 3 can ensure excellent flexure strength so long as it meets the condition "[Thickness t11c of each protective dielectric layer 11c of the dielectric chip 11]<[Thickness t12b of the wraparound part 12b of each external electrode 12]," despite its low height, especially when its height H10 is as low as 150 μm or less.

Among Samples 2A to 2D, on the other hand, Samples 2A and 2B have a flexure strength of 2.5 mm or more and both meet the aforementioned condition as well as the condition "{[Length L12b of the wraparound part 12b of each external electrode 12]/[Length L10 of the low-height capacitor 10]}<0.24." In essence, the low-height capacitor 10 shown in FIGS. 1 to 3 can ensure excellent flexure strength so long as it meets the aforementioned condition as well as the condition "{[Length L12b of the wraparound part 12b of each external electrode 12]/[Length L10 of the low-height capacitor 10]}<0.24," despite its low height, especially when its height H10 is as low as 150 μm or less.

It is practical to set the thickness t11c in the aforementioned condition "[Thickness t11c of each protective dielectric layer 11c of the dielectric chip 11]<[Thickness t12b of the wraparound part 12b of each external electrode 12]" within a range of 5 to 20 μm considering that each protective dielectric layer 11c functions as a protective layer, and it is practical to set the thickness t12b within a range of 8 to 25 μm considering that is directly related to the height H10 of the laminated capacitor 10.

In the meantime, assuming that each external electrode 12 is properly soldered, it is practical that the lower limit of L12b/L10 in the aforementioned condition "{[Length L12b of the wraparound part 12b of each external electrode 12]/[Length L10 of the low-height capacitor 10]}<0.24" is 0.10 or more.

It should be noted that, although each external electrode 12 shown in FIGS. 1 to 3 has an end face 12a covering an end face of the dielectric chip 11 in the length direction, as well as a wraparound part 12b continuing to the end face 12a and partially covering both sides in the height direction and both sides in the width direction of the dielectric chip 11, the same effects mentioned above can be obtained as in the case of the low-height capacitor 10' shown in FIG. 6 in which the external electrode 12' has an end face 12a covering an end face of the dielectric chip 11 in the length direction, as well as a wraparound part 12b whose longitudinal cross-section has roughly a C shape and which continues to the end face 12a and covers both sides of the dielectric chip 11 in the height direction only partially, so long as the aforementioned condition is met.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2013-056599, filed Mar. 19, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A low-height multilayer ceramic capacitor whose height is smaller than its width and which comprises a dielectric chip of roughly rectangular solid shape having an external electrode at each end of the chip in a length direction of the chip, wherein:
    the dielectric chip has multiple internal electrode layers laminated in the height direction alternately with capacity-forming dielectric layers, and has protective dielectric layers each overlaying the respective internal electrode layers provided on both top and bottom sides of the dielectric chip relative to the height direction;
    the external electrodes each have an end face covering an end face of the dielectric chip in the length direction, as well as a wraparound part extending from the end face of the external electrodes and covering at least part of both top and bottom faces of the dielectric chip relative to the height direction;
    ends of some of the multiple internal electrode layers are connected to the end face of one of the external electrodes, while ends of the other multiple internal electrode layers are connected to the end face of the other external electrode; and,
    provided that a thickness of each of the protective dielectric layers of the dielectric chip is given by t11c and a thickness of the wraparound part of each of the external electrodes is given by t12b, t11c and t12b meet a condition "t11c<t12b",
    wherein a height of the low-height multilayer ceramic capacitor is 150 μm or less.

2. A low-height multilayer ceramic capacitor according to claim 1, wherein the wraparound part of each of the external electrodes extends from the end face and partially covers both top and bottom faces relative to the height direction and both side faces relative to the width direction of the dielectric chip.

3. A low-height multilayer ceramic capacitor according to claim 1, wherein t11c is in a range of 5 to 20 μm, and t12b is in a range of 8 to 25 μm.

4. A low-height multilayer ceramic capacitor according to claim 1, wherein a length of the low-height multilayer ceramic capacitor, L10, and a length of the wraparound part, L12b, satisfies the following relationship: $0.10 \leq L12b/L10 \leq 0.24$.

* * * * *